US012450604B2

(12) United States Patent
Rodriguez et al.

(10) Patent No.: US 12,450,604 B2
(45) Date of Patent: *Oct. 21, 2025

(54) COMPUTER-BASED SYSTEMS CONFIGURED TO PROVIDE MULTIMODAL ATM ACCESS VIA MOBILE DEVICES AND METHODS OF USE THEREOF

(71) Applicant: Capital One Services, LLC, McLean, VA (US)

(72) Inventors: Elisa-Michelle Rodriguez, Vienna, VA (US); Kevin Osborn, Newton Highlands, MA (US); Latika Gulati, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,510

(22) Filed: Oct. 23, 2023

(65) Prior Publication Data

US 2024/0054490 A1    Feb. 15, 2024

Related U.S. Application Data

(63) Continuation of application No. 17/088,230, filed on Nov. 3, 2020, now Pat. No. 11,797,990.

(51) Int. Cl.
*G06Q 40/00*      (2023.01)
*G06Q 20/10*      (2012.01)
(Continued)

(52) U.S. Cl.
CPC ....... *G06Q 20/401* (2013.01); *G06Q 20/1085* (2013.01); *H04L 63/0861* (2013.01);
(Continued)

(58) Field of Classification Search
CPC ..................... G06Q 20/401; G06Q 20/1085
See application file for complete search history.

(56) References Cited

U.S. PATENT DOCUMENTS 11,308,481 B1 *  4/2022  Thomas ........... G06Q 20/40155
11,354,632 B1 *  6/2022  Hill ....................... H04W 12/73
(Continued)

OTHER PUBLICATIONS

Schneier, Bruce (Applied Cryptography Second Edition : protocols, algorithms, and source code in C; ISBN 0-471-12845-7; p. 38, paragraph 4; 1996) (Year: 1996).*

(Continued)

*Primary Examiner* — Mark H Gaw
(74) *Attorney, Agent, or Firm* — Greenberg Traurig, LLP

(57) ABSTRACT

Systems and methods of providing multimodal ATM accessibility are disclosed. In one embodiment, an exemplary computer-implemented method may comprise detecting a presence of a wireless device of a user in proximity to the ATM; establishing a communication session between the ATM and the wireless device based on a session key; instructing an app to provide a first graphical user interface (GUI) to the user; authenticating the user for access to the user account at the wireless device based at least on the entered account login information; and commencing, in response to successful authentication of the user, an ATM transaction session for the user by instructing the app to provide a second GUI to the user at the wireless device, the second GUI comprising one or more GUI elements operable by the user to perform one or more ATM transactions with the user account at the wireless device.

20 Claims, 7 Drawing Sheets

(51) Int. Cl.
    *G06Q 20/40*     (2012.01)
    *H04L 9/40*     (2022.01)
    *H04W 4/02*     (2018.01)
    *H04W 8/00*     (2009.01)
    *H04W 12/06*     (2021.01)

(52) U.S. Cl.
    CPC ........... *H04W 4/023* (2013.01); *H04W 8/005* (2013.01); *H04W 12/06* (2013.01)

(56) References Cited

U.S. PATENT DOCUMENTS

| | | | |
|---|---|---|---|
| 11,776,000 B1* | 10/2023 | McCloskey | G06Q 30/0235 705/14.17 |
| 2004/0122771 A1 | 6/2004 | Cell et al. | |
| 2008/0172733 A1 | 7/2008 | Coriaty et al. | |
| 2010/0059587 A1 | 3/2010 | Miller et al. | |
| 2014/0040147 A1 | 2/2014 | Vardarajan et al. | |
| 2014/0111827 A1 | 4/2014 | King et al. | |
| 2014/0123224 A1 | 5/2014 | Nosrati | |
| 2014/0289833 A1 | 9/2014 | Briceno et al. | |
| 2015/0106868 A1 | 4/2015 | Lo et al. | |
| 2016/0125412 A1 | 5/2016 | Cannon | |
| 2017/0346851 A1 | 11/2017 | Drake | |
| 2019/0034915 A1 | 1/2019 | Van Wiemeersch et al. | |
| 2020/0030454 A1 | 1/2020 | Lannutti et al. | |
| 2020/0104842 A1 | 4/2020 | Osborn et al. | |
| 2023/0186313 A1* | 6/2023 | Adkins | G06Q 20/382 705/43 |

OTHER PUBLICATIONS

International Search Report and Written Opinion from International Application No. PCT/US2021/057913 dated Feb. 7, 2022.
Singanamalla et al., "PocketATM: Understanding and Improving ATM Accessibility in India", ICTD'19, Jan. 4-7, 2019 <<https://acm.org/doi/pdf/10.1145/3287098.3287106>> retrieved Jan. 12, 2022.
Hardy, "ATM Access at a Touch of Your Smartphone is Here in Des Moines", Des Moines Register https://www.desmoinesregister.com/story/money/business/2017/04/04/atm-access-your-smartphone-right-here-des-moines/99874738/, Apr. 4, 2017, (Year: 2017).
Supplementary European Search Report from European Patent Application No. 21889994.6 dated Jun. 27, 2024.

* cited by examiner

COMPUTER-BASED SYSTEMS CONFIGURED TO PROVIDE MULTIMODAL ATM ACCESS VIA MOBILE DEVICES AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more novel technological applications involving ATM accessibility aspects configured for various functionality such as establishing communication sessions, enabling authentications, and multimodal interactions in certain instances and/or performing other features.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications.

SUMMARY OF DESCRIBED SUBJECT MATTER

In some embodiments, the present disclosure provides various exemplary technically improved computer-implemented methods involving multimodal ATM accessibility associated with wireless device based transactions, such as a method including at least the steps of:
  detecting, by an ATM, a presence of a wireless device of a user in proximity to the ATM, the wireless device configured with an app having instructions executable in connection with authenticating the user to gain access to a user account of the user via the ATM;
  establishing, by the ATM and in response to the detection of the presence of the wireless device in proximity to the ATM, a communication session between the ATM and the wireless device based on a session key, the session key being received by the wireless device from a transaction card of the user and communicated by the wireless device to the ATM;
  instructing, by the ATM, the app to provide a first graphical user interface (GUI) to the user, the first GUI comprising one or more graphical user interface (GUI) elements prompting the user to enter account login information associated with the user account;
  authenticating, by the ATM, the user for access to the user account at the wireless device based at least on the entered account login information; and
  commencing, by the ATM and in response to successful authentication of the user, an ATM transaction session for the user by instructing the app to provide a second GUI to the user at the wireless device, the second GUI comprising one or more GUI elements operable by the user to perform one or more ATM transactions with the user account at the wireless device,
  wherein the first GUI and the second GUI are configured to enable user interactions with the ATM via one or more of: a visual mode, an audible mode, a Morse code mode, and a tactile mode.

In some embodiments, the present disclosure provides various exemplary technically improved computer-implemented systems involving multimodal ATM accessibility associated with wireless devices based transactions, such as a system including at least the following components of:
  one or more processors; and
  a memory in communication with the one or more processors and storing instructions that, when executed by the one or more processors, cause the system to:
    detect a presence of a wireless device of a user in proximity to the system, the wireless device configured with an app having instructions executable in connection with authenticating the user to gain access to a user account of the user via the system;
    establish, in response to the detection of the presence of the wireless device in proximity to the system, a communication session between the system and the wireless device based on a session key, the session key being received by the wireless device from a transaction card of the user and communicated by the wireless device to the system;
    instruct the app to provide a first graphical user interface (GUI) to the user, the first GUI comprising one or more graphical user interface (GUI) elements prompting the user to enter account login information associated with the user account;
    authenticate the user for access to the user account at the wireless device based at least on the entered account login information; and
    commence, in response to successful authentication of the user, an ATM transaction session for the user by instructing the app to provide a second GUI to the user at the wireless device, the second GUI comprising one or more GUI elements operable by the user to perform one or more ATM transactions with the user account at the wireless device,
    wherein the first GUI and the second GUI are configured to enable user interactions with the system via one or more of: a visual mode, an audible mode, a Morse code mode, and a tactile based mode.

In some embodiments, the present disclosure also provides exemplary technically improved computer-based systems, and computer-readable media, including computer-readable media implemented with and/or involving one or more software applications, whether resident on transaction cards, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
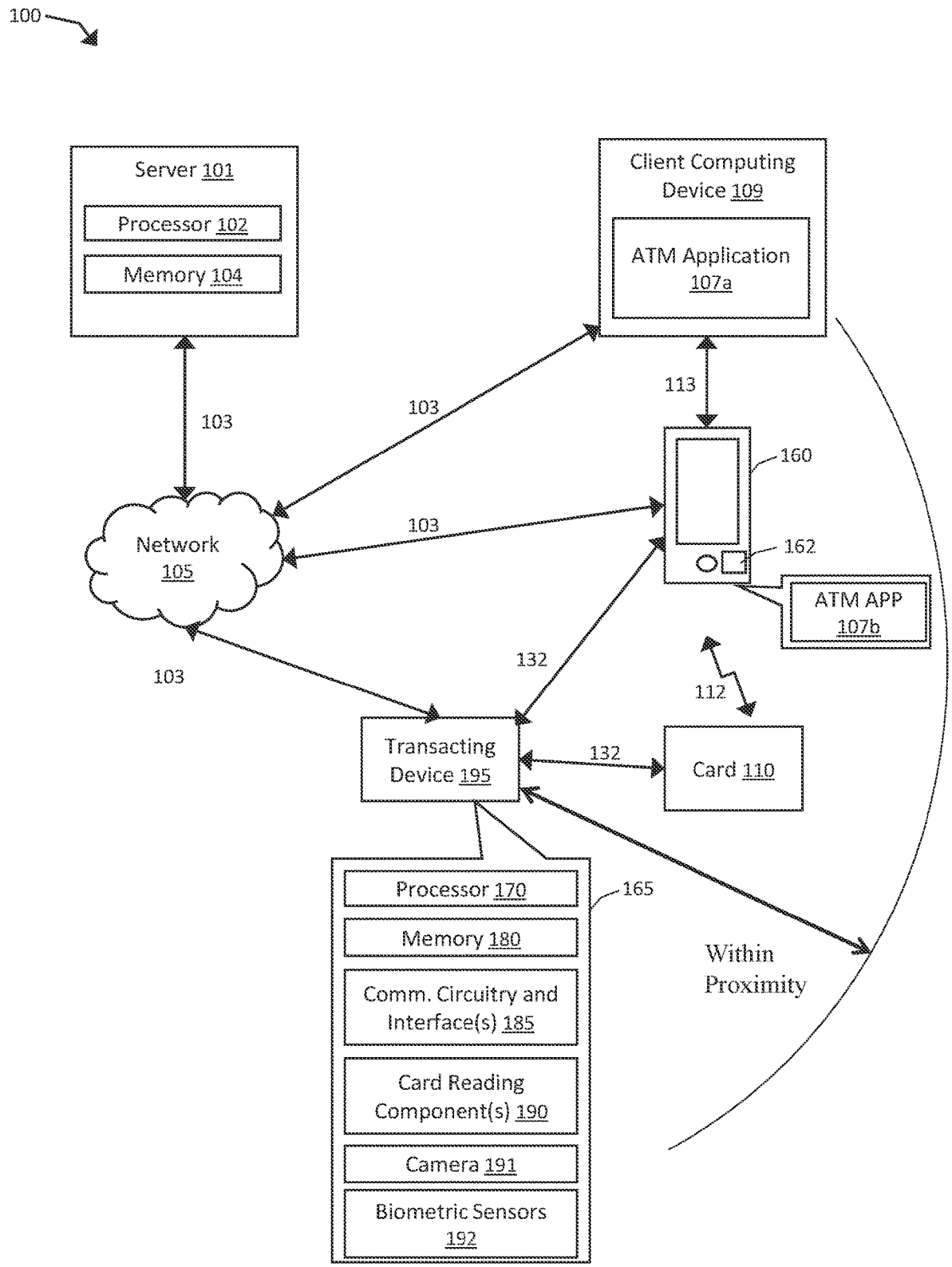
FIG. 1 is a block diagram of an exemplary system and/or platform involving multimodal ATM accessibility features for wireless device based transactions, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As explained in more detail, below, various exemplary computer-based systems and methods of the present disclosure allow for improved ATM accessibility such as, but not limited to, wireless device based transactions with transacting devices such as, but not limited to, automated teller machines (ATMs). In one embodiment, an exemplary computer-implemented method of the present disclosure may include detecting a presence of a wireless device of a user in proximity to an ATM, establishing a communication session between the ATM and the wireless device based on a session key, authenticating the user of the wireless device for access to an account of the user, commencing an ATM transaction session to allow the user to perform one or more ATM transactions via the wireless device in one or more of: a visual mode, an audible mode, a Morse code mode, and a tactile mode.

While the acronym ATM (automated teller machine) is used frequently herein, it should be understood that the disclosed technology pertains to any relevant transacting device with which transaction cards and/or wireless device herein interact, i.e., the devices on which self-service may be conducted. Non-limiting examples of such transaction devices include POS (point-of-service, point-of-sale, etc.) devices, payment kiosks, and any other type of transaction card reader (magnetic or otherwise) that reads or receives card or customer information based on an interaction of a transaction card with such device.

Various embodiments disclosed herein may be implemented in connection with one or more entities that provide, maintain, manage, or otherwise offer any services via transacting devices. In some embodiments, exemplary entity may be a financial service entity that provides, maintains, manages, or otherwise offers financial services. Such financial service entity may be a bank, credit card issuer, or any other type of financial service entity that generates, provides, manages, and/or maintains financial service accounts that entail providing a transaction to one or more customers, the transaction card configured for use at an ATM to access an associated financial service account. Financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary computer-based system 100 illustrating aspects of improved, multimodal ATM accessibility via wireless devices, in accordance with one or more embodiments of the present disclosure. System 100 may include at least one server 101, at least one wireless device 160, at least one transaction card 110, and at least one transacting device 195, which may all communicate 103 over at least one communication network 105. Transacting device 195 may be an automated teller machine (ATM), a comparable POS (point-of-sale, point-of-service, etc.) device, or other terminal or computer that processes transactions authorized via a transaction card 110 and/or the wireless device 160, as explained above. To attract more transactions at transacting device 195 and render more satisfactory user experience, the business or merchant associated with the transacting device 195 and typically a financial institution, such as a credit card company that has issued the card 110 to the user, have incentive and desire to enhance the transacting device to provide convenient, secure and multimodal accessibility at the transacting device 195. Embodiments herein relate to systems and methods whereby transacting devices 195 can establish a communication session with wireless devices of users, based at least in part on detecting that a wireless device of a user is in the vicinity of a transacting device, to enable accessibility of ATM functions via the wireless device of the user. This way, in some embodiments, at least part of the functionality of the conventional user interfaces of the ATM is "migrated" over to the wireless device, in various interaction modes such as visual, audible, Morse code based, tactile based, and the like. Here, for example, embodiments herein may also leverage the fact that the user who intends to perform ATM transactions is often, in addition to being in possession of the transaction card, near to the user's wireless device (e.g., mobile device), such as a smartphone, smartwatch, tablet, iPAD, iPOD, laptop computer, headset, braille enabled smartwatch, voice enabled smartwatch, wearable device or the like, for example, and may use functionality associated with the user's wireless device and the transaction card, including the interaction between the two, as a part of various multimodal ATM accessing processes set forth herein.

The exemplary system of FIG. 1 may include an exemplary computing device 109, such as at least one client computing device, associated with at least one user, such as an owner of the transaction card 110. In some embodiments, the exemplary computing device 109 may be configured to execute, among other programs, an ATM application 107*a*. In some embodiments, exemplary ATM application 107*a* may be one or more software applications configured to perform operations consistent with providing an ATM app 107*b*, e.g., for mobile device 160, and/or a portal, e.g., via web pages, to the user, for accessing online accounts and managing various other aspects of accounts associated with the transaction card 110. The exemplary ATM application 107*a* may provide various functionalities associated with configuring and managing ATM accessibility for one or more wireless devices, as well as functionality involved with the transaction card based features herein, such as shown and described below in connection with FIGS. 2-3. In some embodiments, a wireless device and its extension devices (e.g., a mobile phone and a headset connected thereto via Bluetooth) may have to be provisioned with the ATM application 107*b* (and the computing device 109 with ATM application 107*a*) before it can be used to perform ATM transactions when in vicinity to an ATM. For example, only a headset pre-configured via the ATM application 107*a* can used in conjunction with a mobile phone to access the ATM via an audible mode. For another example, only a provisioned smartwatch can be used to access an ATM via a Morse code mode, with the user entering Morse code element at the smartwatch and the ATM operating in Morse code mode correspondingly. In implementations, such provisioning may provide the hardware, software, firmware identification information, and the like of the wireless device, as well as the user information, user account information, user's transaction card information, and the like to a server. Further, such provisioning may also provide security measures in extending ATM functions over to a wireless device in various user interaction modes. For instance, during the provisioning, key related information may also be pre-generated and/or pre-stored either at the server and/or at the provisioned wireless devices. In some embodiments, ATM applications 107*a* and/or 107*b* may also be hosted and/or operated, in whole or in part, by at least one remote system and/or server, such as by a server 101 associated with a financial services entity that provides the transaction card 110 to a card owner; and an instance of ATM applications 107*a*/107*b* may be pushed to the wireless device 160 and/or computing device 109 upon the ATM detects a presence of the wireless device 160 and/or computing device 109 in proximity.

In some embodiments, server(s) 101 may be associated with one or more entities that are stakeholders to card transactions at the transacting device 195, such as the business or merchant, one or more financial services providers, such as an issuer of a credit card, debit card, or other transaction card associated with the attempted transaction.

In the embodiment shown in FIG. 1, an illustrative transacting device 195 may comprise: one or more processing components and/or computer readable media 170, memory 180, communication circuitry and/or interfaces 185, and at least one card reading component 190. Such card reading component(s) 190 may be configured to read information from a transaction card 110; for example, the at least one card reading component may comprising one or more of a magnetic stripe reader, a chip reader, and/or a first near field communication (NFC) component. Communication circuitry and/or interfaces 185 may comprise at least one wireless device transceiver component configured to communicate, before and/or during execution of a transaction, with a mobile device 160 (and/or computing device 109) presented for access, the mobile device transceiver component comprising a second NFC component. In some embodiments, the transacting device may further comprise one or more cameras 191, and/or one or more biometric sensors 192. In other embodiments, the transacting device 195 may further include components for interacting with the user at the wireless device 160 (and/or computing device 109) in audible mode and/or Morse code. In some embodiments, the audible mode may be provided by devices that are operative to interface the user with audible music, beeps, signals, and/or voice instructions for performing ATM transactions. In some examples, such devices are operative on NFC communication sessions including Bluetooth connection between the transacting device 195 and the wireless device 160 (and/or computing device 109).

In some embodiments, exemplary processing components and/or computer readable media 170 may be configured to execute instructions associated with performing methods such as that described below in more detail in connection with FIG. 3 and elsewhere herein.

Referring to FIG. 1, server 101 may include at least one processor 102, a memory 104, such as random-access memory (RAM), and a risk model 106. In some embodiments, server 101 may be operated by the entity issuing the transaction card, by the merchant, and/or by any transaction processing entity involved with authorizing the transaction card for use.

In some embodiments, the transaction card 110 may be a traditional credit card, debit card, a smart card, or an RFID card, and may be formed from plastic, metal, or any other suitable material. Transaction card 110 may include card circuitry formed directly therein, and/or disposed therein by gluing, bonding or by any suitable adhesion method for affixing circuitry to the material of transaction card 110. Card circuitry may be configured to utilize any hardwired circuitry. Card circuitry may be implemented as one or more integrated circuit chips, and/or electronic devices, electrically interconnected and bonded to one or more circuit boards, for example. In some embodiments, the transaction card 110 may be a contactless card. In some other embodiments, the transaction card 110 may include an radio-frequency identification (RFID) chip. In other embodiments, the transaction card 110 may be a smart card.

Mobile device 160, such as a smart phone or other portable or wireless or wearable electronic device, may include mobile device circuitry 162. Mobile device circuitry 162 may include a mobile device processor, memory such as RAM, computer-readable media, communication circuitry and interface, and/or any input and/or output device, such as a touchscreen display. The memory may store code that, when executed by processor, may cause processor to implement one or more aspects of various ATM accessibility schemes herein, including those involving: (1) directing/navigating a card owner to a nearby ATM, (2) executing a software application on the mobile device 160, such as for provisioning one or more wireless devices for accessibility to ATMs against an account of the card owner, (3) authenticating the card owner using biometrics (e.g., fingerprints, voice recognition, facial recognition, etc.), (4) detecting a geo-location of the mobile device, (5) detecting a presence of an ATM in proximity, and/or (6) establishing a communication session with an ATM to perform various other related functionality when in proximity to the ATM. Mobile device may also display various graphical user interfaces that a card owner may utilize to implement, configure and/or manage ATM accessibility features herein. In some embodiments, mobile device 160 may be configured to operate in conjunction with other wireless devices (e.g., wearable devices, headset) to enable multimodal user interfaces for performing ATM transactions. For example, a headset may be connected to a mobile phone to enable an audible interface in addition to and/or in place of the graphical user interface displayed at the mobile phone. In another example, a headset may be connected to a Mores code and/or braille enabled smartwatch to further augment the ATM access modality with an audible interface, in addition to or in place thereof. In some embodiments, an application running on mobile device 160, such as an application supplied by the entity issuing the transaction card and/or managing the transactions of the transaction card owner, may include various modules that may transmit information to the transacting device, relay information back to the entity (e.g., server 101), and/or communicate with other computing components.

Various embodiments associated with FIG. 1 and related disclosure herein solve a technical problem of augmenting transacting devices with expanded accessibility via wireless devices of users in a secure manner. Various embodiments are implemented based on features and functionality including detecting a presence of a mobile device in the vicinity of an ATM, using a transaction card of the user for key generating and sharing to establish communication sessions between the mobile device and the ATM, as well as various mobile device based solutions that include features and functionality for providing multimodal ATM accessibilities. Various features and functionality disclosed herein may be utilized in connection with improving transacting device accessibility and/or authentication processes that involve pairing of transacting device 195 with mobile device 160, by use of a transaction card, while executing a software application on the mobile device 160 for interacting with and gathering information regarding a nearby ATM. In other embodiments, various information gathered via the mobile device 160 and/or the device or card owner may be relayed back to server 101 (e.g., server processor 102) so as to perform more detailed presence detection, user authentication, user preference based customized ATM access menu, such as to provide ATM accessibility at the mobile device of the user.

In some embodiments, an initial authentication for pairing the transaction card 110 with the mobile device 160 may be implemented by the user contacting the entity from the user's mobile device to initially authorize the pairing of transaction card 110 with mobile device 160 so as to receive pairing approval. In other embodiments, the pairing and/or unpair processes between the transaction card and the mobile device may occur automatically and seamlessly such as without any action on the part of the user, particularly if the same mobile device had been previously paired with the same transaction card in the past. In yet other embodiments, proximity MFA may use biometrics (e.g., fingerprint, voice recognition, etc.) and/or a password entered by the user and/or a swiping of the mobile device screen by a finger of the user and/or the proximity of the transaction card to the mobile device or any client device, for example, to pair or unpair the transaction card with the mobile device or client.

In some embodiments, an initial authentication for pairing the transaction card 110 with both the computing device 109 may be implemented by the user contacting the entity from the user's mobile device to initially authorize the pairing of transaction card 110 with computing device 109 so as to receive pairing approval. In other embodiments, the pairing and/or unpair processes between the transaction card and the computing device may occur automatically and seamlessly such as without any action on the part of the user, particularly if the same computing device had been previously paired with the same transaction card in the past. In yet other embodiments, proximity MFA may use biometrics (e.g., fingerprint, voice recognition, etc.) and/or a password entered by the user and/or an operation (e.g., tapping) at the computing device by a finger of the user and/or the proximity of the transaction card to the computing device or any client device, for example, to pair or unpair the transaction card with the wireless device and the computing device or client.

In some embodiments, an initial authentication for pairing the transaction card 110 with both the wireless device 160 and computing device 109 may be implemented by the user contacting the entity from the user's mobile device to initially authorize the pairing of transaction card 110 with both wireless device 160 and computing device 109 so as to receive pairing approval. In other embodiments, the pairing and/or unpair processes between the transaction card and both the wireless device and the computing device may occur automatically and seamlessly such as without any action on the part of the user, particularly if the same computing device had been previously paired with the same transaction card in the past. In yet other embodiments, proximity MFA may use biometrics (e.g., fingerprint, voice recognition, etc.) and/or a password entered by the user and/or an operation (e.g., tapping) at the wireless device and/or the computing device by a finger of the user and/or the proximity of the transaction card to the wireless device and the computing device or any client device, for example, to pair or unpair the transaction card with the wireless device and the computing device or client. While only one server 101, computing device 109, network 105, transacting device 195, mobile device 160, and transaction card 110 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 109 may be one or more computing devices configured to perform operations consistent with executing ATM application 107*a*. Wireless device 160 may be one or more computing devices configured to perform operations consistent with executing ATM application 107*b*.

Figure 2:
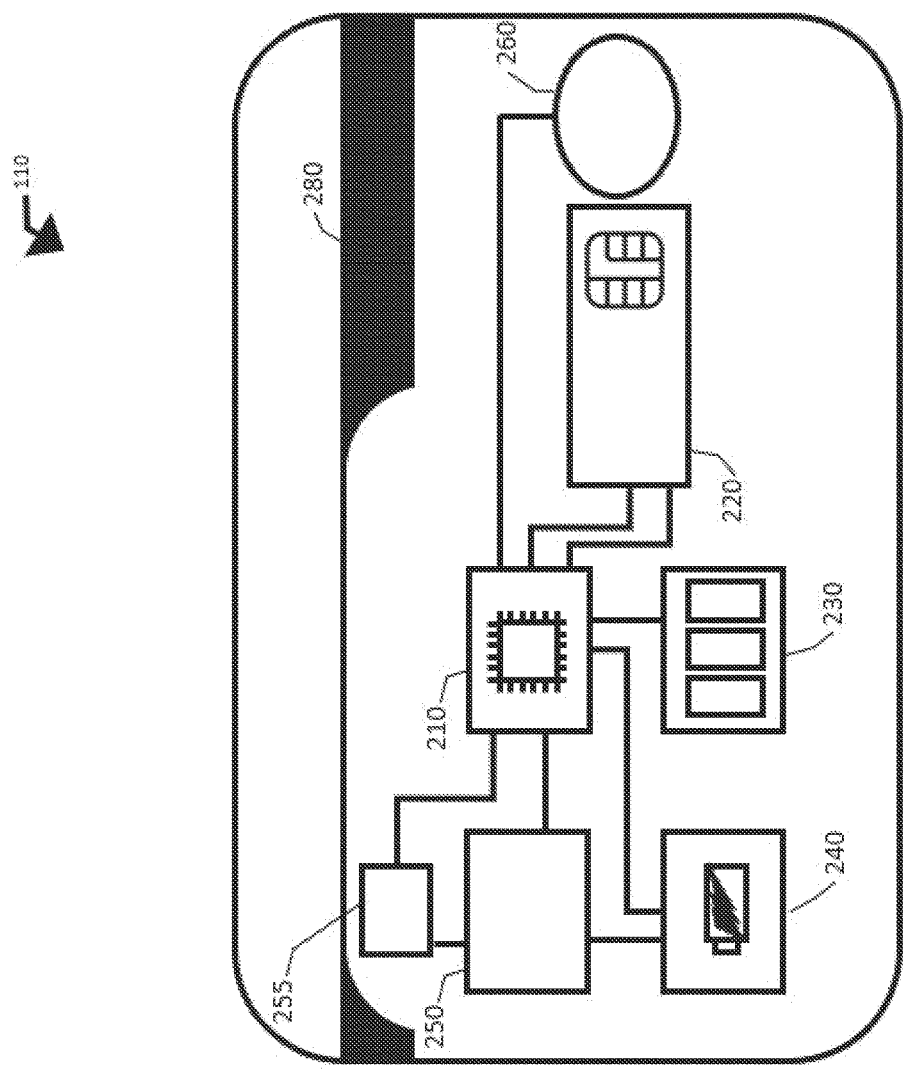
FIG. 2 is a block diagram illustrating an exemplary transaction card related to providing ATM accessibility associated with wireless device based transactions, consistent with exemplary aspects of certain embodiments of the present disclosure.

FIG. 2 is a diagram illustrating an exemplary simplified transaction card related to performing ATM transactions at a wireless device, consistent with exemplary aspects of certain embodiments of the present disclosure. In some embodiments, transaction card 110 may be the approximate size and shape of a traditional credit card, debit card, or the like. Transaction card 110 may have embedded electronics for performing various aspects of the disclosed innovations. As shown, transaction card 110 may include at least one processor 210 or processing circuitry, memory 230, power source or power circuitry 240, fingerprint input elements and/or circuitry 260, one or more other sensors 250, communication circuitry/devices 255, a magnetic stripe 280, and other coupling circuitry 220 such as an electronic chip element and associated interconnects. Power source or power circuitry 240 may include elements that generate power for the card upon coupling to a POS device, such as by connection via an electronic chip, and/or such circuitry may include a voltage supply such as a battery. In some embodiments, transaction card 110 may include more or fewer components than shown in FIG. 2.

Processor 210 may comprise one or more known or specialized processing devices, of sufficient size and form factor to fit within transaction card 110 when configured to be about the size of a traditional credit or debit card. In some embodiments, processor 210 may include any configuration capable of performing functions related to the disclosed methods such as, for example, generating and transmitting the identifier, information relating to the validation of the fingerprint verification associated with usage of the transaction card 110, which may be based on the various fingerprint inputs 250, 260 generated by the transaction card 110. Processor 210 may also control power source 240, send and receive data, read from and written to memory 230, receive and analyze data from sensors 250, process information or instructions associated with the coupling circuitry 220, receive and process input from the fingerprint input elements and/or circuitry 260, and any other functions consistent with the disclosed embodiments.

Memory 230 may include volatile or non-volatile, magnetic, semiconductor, or other type of storage elements and/or tangible (i.e., non-transitory) computer-readable medium that stores relevant instructions and data, such as information needed for or associated with conducting card transactions. With regard to the fingerprint validation result generated by the card 110, such instructions, when executed by the processor 210, cause the card 110 to perform operations associated with fingerprint based card activation. In some embodiments, the operations may comprise transmitting, when a purchase transaction is attempted, to an online entity, information related to the validation of the fingerprint verification to the online entity by the wireless communication circuitry 255. In one example, the information related to the validation of the fingerprint verification is transmitted to one or more of: a wireless computing device, a server, and/or a mobile device associated with the card user. In another example, the information related to the validation of the fingerprint verification is transmitted to one or both of: (i) at least one merchant computer associated with the online entity, and (ii) the server associated with the provider of the transaction card 110, to authorize the transaction attempt.

In some embodiments, the operations may be further configured to: (i) activate the card control circuitry 135, when the card 110 enters a proximal engagement with a point of sale terminal or a mobile device associated with the card user (e.g. via tap, NFC, Bluetooth, etc.), from a sleep mode in which a transaction capability is disabled; (ii) activate, upon verifying that the detected fingerprints are valid, the card 110 for purposes of completing transactions; and/or (iii) transmit the transaction by a suitable communication medium (e.g., NFC, RFID, Narrow Band Internet of Things (NBIOT), WiFi, WiMax, ZigBee, Bluetooth, etc.).

In other embodiments, the instructions may comprise an applet comprising instructions for validating the transaction or the card 110 by requiring one or more of: i) an additional validation action; and/or ii) additional communication with an application on a mobile device associated with the card user. Here, for example, the additional validation action may include a supplemental communication with the user to validate the online purchase transaction, such as via text, phone call, etc., supplemental action performed via an online application associated with the transaction card (such as requiring the user to log into their mobile app), and/or other communications to a user that enable the user to reply with an electronic communication to confirm such purchase, such as a communication to any laptop, mobile or wearable device selected by the user. The additional communication with an application on the user's mobile device may include, for example, activating the card or changing a setting within the application, responding to a prompt within the application requesting validation of the purchase transaction, or simply requiring the user to successfully log into an app, such as an online app, mobile app, or the like.

According to various embodiments, the operations may further comprise one or both of: (i) inform a transacting device, at which the transaction is submitted, whether or not the card 110 is authorized to complete the transaction; and/or (ii) instruct a transacting device to communicate by the Bluetooth communications with an application on a mobile device associated with the card user regarding performance of additional processing associated with the transaction attempt.

Power source 240 may include a power storage device such as a battery or capacitor, a power receiver such as an inductive power coil or a wireless power receiver, a power generator such as a solar or kinetic power generator, or any combination thereof. In some embodiments, power source 240 may include one or more other known devices capable of generating, receiving, and/or storing electrical energy.

In some embodiments, one or more sensors 250 may include one or more devices capable of sensing the environment around transaction card 110, movement of the transaction card 110, and/or other detectable interactions involving the transaction card 110. In some embodiments, such sensors 250 may include, for example, one or more of a camera, an optical sensor, a microphone, a gyroscope, an accelerometer, a shock sensor, a position sensor, a light sensor such as an ambient light sensor, a temperature sensor, a touch sensor, a conductivity sensor, and/or a haptic sensor.

Sensors 250 may also include one or more buttons, switches, other tactile input mechanisms, or other forms of user-derived input for receiving an indication or instruction from a card user. In some embodiments, such input devices may receive a sequence or series of inputs, to cause processor 210 to perform various functions associated with the disclosed embodiments.

The transaction card may, optionally, also include a display, which may comprise a screen, indicator light, or other appropriate device for displaying a status or message to user. In some embodiments, display may include a small LCD screen, e-ink screen, or OLED display or one or more LEDs. In some embodiments, display may provide notifications, prompts, and/or messages to user.

In some embodiments, transaction card 110 may include communication circuitry/devices 255 such as antennae and/or NFC (near-field communication) circuitry, for transmitting and/or receiving data from one or more external locations. Communication circuitry 255 may comprise a short-range wireless transceiver, or a near-field communication (NFC) chip. Communication circuitry 255 may be configured to communicate with mobile device 160, a contactless card reader associated with the POS device 195, other systems, and/or other sensors configured to detect the presence of transaction card 110. In other embodiments, communication circuitry/devices 255 may comprise Bluetooth circuitry for processing Bluetooth communications. In one example, the Bluetooth circuitry may comprise at least one Bluetooth antenna configured for Bluetooth low energy (BLE) communication. In another example, communication circuitry/devices 255 may comprise RFID communication circuitry. According to various embodiments, wireless access to user data on the card 110 is disabled until the card 110 is activated by verifying that the one or more detected fingerprints are valid.

In some embodiments, transaction card 110 may include at least one magnetic stripe 280 or other magnetic communication medium that may share or read magnetically-stored information. In some embodiments, magnetic stripe 280 may be controlled by processor 210. For example, processor 210 may write, clear, and rewrite magnetic stripe 280, to provide particular account information.

According to various embodiments of the disclosed innovation, transaction card 110 may be configured to, via interactions with the transacting device and the mobile device, generate and share a session key used for establishing a communication session between the mobile device 160 and transacting device 195. Such interaction may be implemented via a contact based (e.g., swiping, inserting) and/or a contactless (e.g., tapping) motion involving the transaction card 110. Details of the session key involving the use of the transaction card are described with connection to FIG. 3, below.

Figure 3:
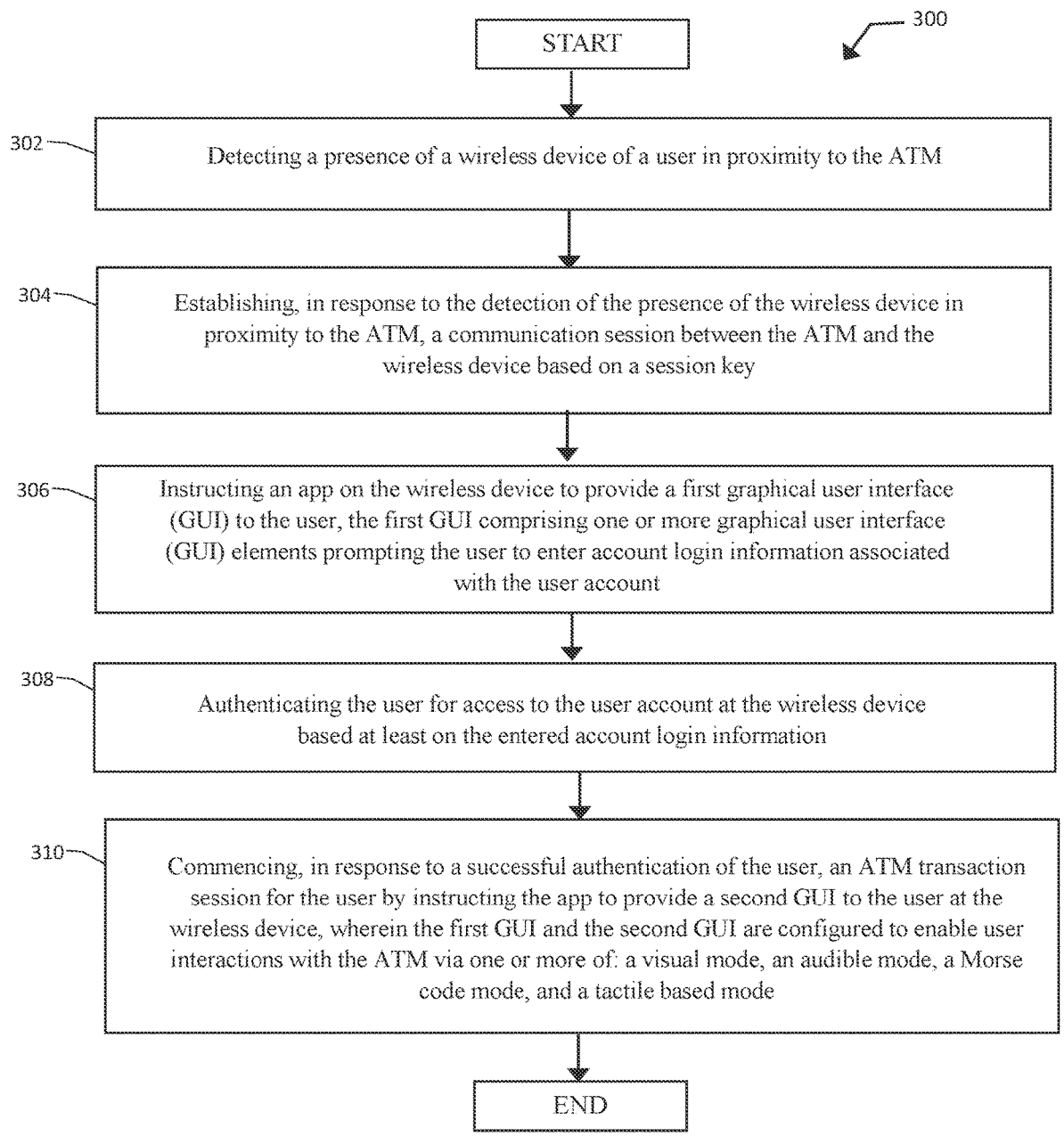
FIG. 3 is a flowchart illustrating an exemplary process related to providing multimodal ATM accessibility associated with wireless device based transactions, consistent with exemplary aspects of certain embodiments of the present disclosure.

FIG. 3 is a flowchart illustrating an exemplary process 300 related to providing multimodal ATM accessibility via mobile devices, consistent with exemplary aspects of at least some embodiments of the present disclosure. Referring to FIG. 3, the illustrative ATM accessibility process 300 may comprise: detecting a presence of a wireless device of a user in proximity to a transacting device 195, such as automated teller machines (ATMs), at 302; establishing, in response to the detection of the presence of the wireless device in proximity to the ATM, a communication session between the ATM and the wireless device based on a session key, at 304; instructing an app on the wireless device to provide a first graphical user interface (GUI) to the user, the first GUI comprising one or more graphical user interface (GUI) elements prompting the user to enter account login information associated with a user account, at 306; authenticating the user for access to the user account at the wireless device based at least on the entered account login information, at 308; and commencing, in response to successful authentication of the user, an ATM transaction session for the user by instructing the app to provide a second GUI to the user at the wireless device, at 310. According to various embodiments, the first GUI and/or the second GUI may be configured to enable user interactions with the ATM via one or more of: a visual mode, an audible mode, a Morse code mode, and a tactile mode. In some embodiments, the ATM accessibility process 300 may be performed by the transacting devices 195. In other embodiments, the ATM accessibility process 300 may be carried out, in whole or in part, in conjunction with a server, and/or a mobile device that is connected via one or more networks to the server, which is executing instructions for performing one or more steps or aspects of various embodiments described herein.

In some embodiments, ATM accessibility process 300 may include, at 302, a step of detecting a presence of a wireless device of a user in proximity to a transacting device 195, such as automated teller machines (ATMs). According to various aspects of the innovation, the wireless device may be configured with an app having instructions executable in connection with authenticating the user to gain access to a user account of the user via the ATM. In some embodiments, the app may be implemented as the ATM app above-described in connection to FIG. 1. In some embodiments, the app may be configured such that portions of its features can be only activated upon receiving an indication that an ATM is in its vicinity. In implementations, step 302 may be performed by at least one processor, such as a processor associated with the transacting device, and/or at least one entity involved with transactions at the transacting devices. Such entity may be a financial institution such as a bank, credit card issuer, or any other type of financial service entity that generates, provides, manages, and/or maintains financial service accounts for one or more customers.

Various techniques may be utilized to detect the presence of the wireless device of the user in proximity to the ATM, without limitation. For instance, embodiments herein may be configured such that the detection of the presence of the wireless device of the user in proximity to the ATM may comprise one or more of: displaying first scannable information on a display screen of the ATM and receiving an indication that the first scannable information is scanned by the wireless device; scanning, by a camera of the ATM, second scannable information displayed at the wireless device; detecting a geo-location associated with the wireless device indicating that the wireless device is in proximity to the ATM; and/or detecting a wireless signal transmitted from the wireless device indicating that the wireless device is in proximity to the ATM. In implementations, the ATM may be configured to display a first scannable information (e.g., bar code, QR code) on its display, and a user in proximity may use the wireless device to scan the first scannable information and in turn transmit a scanning result back to the ATM to confirm a presence of the wireless device in proximity to the ATM. Further, once the user is in proximity to the ATM, the user may operate the wireless device to generate and display a second scannable information (e.g., bar code, QR code), and in turn provides the second scannable information for a camera of the ATM to scan and identify the wireless device as in proximity thereto. Further, for location service (e.g., GPS) enabled wireless device, the ATM may be configured to compare its own location information with a current geo-location of the wireless device to determine whether a distance between the two is short enough to determine whether the wireless device is in proximity. In implementation, a threshold distance may be pre-configured based on the NFC and other wireless communication functionality of the ATM. Likewise, the ATM may also be configured to detect wireless signals transmitted by the wireless device via communication channels over NFC, Wi-Fi, and the like.

The ATM accessibility process 300 may include, at 304, a step of establishing, in response to the detection of the presence of the wireless device in proximity to the ATM, a communication session between the ATM and the wireless device based on a session key. According to various aspects of the innovation, the session key may be received by the wireless device from a transaction card of the user and communicated by the wireless device to the ATM. In some embodiments, the session key may be generated based on a first interaction between the transaction card and the ATM. In some embodiments, the session key may be shared with the wireless device via a second interaction between the transaction card and the wireless device. Here, for example, with a contactless transaction card, the user may tap the card on the ATM (e.g., on a contactless icon indicated on the ATM) such that the ATM reads a newly generated random number from the transaction card to generate and store a new session key at the transaction card. In some embodiments, the number retrieved from the transaction card may be used as the session key itself by the ATM. In turn, the user may further tap the transaction card at the wireless device of the user to transmit the key established with the ATM with the wireless device. In the example where the random number retrieved by the ATM from the transaction card is used as a seed number to generate the session key, based on the provisioning of the transaction card and the wireless device via the ATM application 107b of FIG. 1, the wireless device may be configured with the knowledge or access to the counter used by the transaction card to generate random numbers. As such, upon the tapping of the transaction card, the wireless device may be configured to compute the random number retrieved by the ATM and consequently compute the session key. In one embodiment, the contactless transaction card may be a contactless smart card.

Once the wireless device is confirmed as in the vicinity of the ATM, the communication session between the ATM and the wireless device may be established leveraging the functionality of the NFC components on both the ATM and the wireless device. In some embodiments, such communication session is implemented using Bluetooth pairing mechanisms, and the key generated by the interaction of the transaction card and the ATM, and shared to the wireless device may serve as a Bluetooth pin code or passkey. Here, for example, the ATM may be configured to send, using its NFC component, a pairing request to the wireless device: 1) upon detecting that the wireless device is present in its vicinity; and 2) after the transaction card has interacted with ATM to generate a session key. In some embodiments, the pairing request may include data such as the identify information of the ATM, a timestamp, information regarding the transaction card, and the like. Subsequently, upon receiving the session key shared by the transaction card, the wireless device may send to the ATM a pairing response, thereby resulting in a successful pairing between the ATM and the mobile device. The following non-limiting example illustrates a process for generating the session key using an exemplary contactless smartcard.

In one embodiment, in order for the transaction card to generate a session key for establishing a communication session between the mobile device and the transacting device, a set of master keys is generated in association with the transaction card 110 beforehand. In some embodiments, the set of master keys may include at least two master keys: one being used for encryption (e.g., ENC key); and the other being used for message authentication codes (e.g., MAC key). In implementation, one or more of the set of master keys may be generated randomly. Here, for example, one or more of the master keys may be generated based on a Bank Identification Number (BIN), or Issuer Identification Number (IIN), associated with the transaction card. In other examples, one or more of the master keys may be generated based on other information such as information on an account, issuer, brand, and/or network, associated with the transaction card 110.

In some embodiments, a session key application may be programmed onto the transaction card. For instance, an Applet may be stored in the memory 230 of the transaction card for execution by the processor 210 of the transaction card. Further, card level master keys may be generated for storage in association with the session key application. In various embodiments, such card level master keys may be generated in accordance with the above-described set of master keys. In some embodiments, such card level master keys may be generated via techniques such as key diversification (UDKS). In one example, using a unique card identifier of the transaction card, a card level ENC key and/or a card level MAC key may be generated by combining the ENC key, MAC key with a shared secret number via the key diversification techniques. In some embodiments, the secret number may be a number shared with the server 101 via a variety of mechanisms such as user configuration, system designation, or a combination thereof. In some embodiments, one or more of the card level ENC key, card level MAC key, the unique card identifier, and the shared secret number may be stored in association with the session key application in the memory 230.

When the transaction card 110 is tapped at the transacting device 195, a counter executing on the transacting card 110 may be incremented once. In one example, such counter may include a Presto Application Transaction counter (pATC). Subsequently, a session key for ENC key (e.g., ENC session key) and a session key for MAC key (e.g., MAC session key) may be dynamically generated by combining the card level ENC key and the card level MAC key, respectively, with the unique card identifier (e.g., a presto unique identifier (pUID)) and pATC.

In some embodiments, an MAC (e.g., session key) may be generated using one of the MAC algorithms. In one example, the retail MAC algorithm (e.g., MAC algorithm 3) may be utilized to generate the MAC. For instance, the MAC may be generated using a derived MAC session key (e.g., dynamic MAC session key) and a message comprising one or more of: version information, pUID, pATC, and the shared secret number.

In some embodiments, the MAC may be further encrypted using the ENC session key to generate a cryptogram. Further, via the communication channel with the transacting device 195, the transaction card may be configured to send a message (e.g., cryptogram bearing message, presto message) including one or more of: a version number, pUID, pATC, and the cryptogram to the transacting device. In some embodiments, the transacting device may further forward the received version number, pUID, pATC, and the cryptogram to server 101.

On the receiving side for the above-described cryptogram bearing message, a server (e.g., server 101, transacting device 195, mobile device 160) may be configured to validate the cryptogram using various techniques. For example, the server may be configured to perform a series of the same operations to generate the cryptogram independently using the data of the cryptogram bearing message. By comparing the server generated cryptogram with the card generated cryptogram, the server may be configured to validate the received cryptogram if the two are determined as the same. In some embodiments, the above-described shared secrete number may be used to generate the server side cryptogram. Since the shared secret number is not transmitted from the transaction card itself, embodiments of the disclosure provide further security against brute force attacks on cryptograms.

In some embodiments, when the transaction card 110 is tapped at the mobile device 160 after being tapped at the transacting device first, another cryptogram bearing message may be generated by the transaction card and transmitted to the mobile device 160. In some embodiments, the mobile device 160 may in turn forward the received cryptogram bearing message to server 101. As above-described, the cryptogram bearing message receiving entity may be configured to validate the received information by performing the same series of operations to generate the cryptogram, using the data included in the cryptogram bearing message. In some embodiments, based a continuously incrementing on-card counter (e.g., pATC), the cryptogram receiving entity may be configured to compute a cryptogram previously or subsequently generated by the transaction card using the counter and/or other data included in the cryptogram bearing message. This way, a session key may be configured based on either the MAC information transmitted to the transacting device 195, or the MAC information transmitted to the mobile device. In first scenario, the mobile device may be configured to generate the MAC information transmitted via the first tap at the transacting device based on the received cryptogram bearing message, and in turn communicate the MAC information generated via the first tap to the transacting device to establish a secure communication. In the second scenario, the mobile device may be configured to communicate the received MAC information to the transactive device, which in turn computes and validate the received MAC information using the cryptogram bearing message received from the transaction card, thereby using the receiving MAC information as the session key to establish a secure communication with the mobile device.

According to other aspects of the disclosure, the cryptogram generated via the tapping at the transacting device may be stored at the transaction card. This way, when the transaction card is tapped at the mobile device, the cryptogram stored at the transaction card may be transmitted to the mobile device upon the second tap of the transaction card.

In some embodiments, and as above-described, the transaction card and/or the ATM may be further configured to encrypt the session key prior to communicating the session key to the wireless device. In other embodiments, the wireless device may be configured to apply algorithms to decrypt the session key, based on information including, for example, a timestamp, transaction card information, presto card counter, and the like. Various embodiments herein may be configured such that both symmetrical and asymmetrical encryption techniques may be applied to the operations of the transaction card and the wireless device.

According to some aspects of the innovation, operations corresponding to the user accessing the ATM at the wireless device may be communicated to the ATM over the above-described communication session between the ATM and the wireless device. According to other aspects of the innovation, such operations of the user to access the ATM at the wireless device may be communicated to the ATM over a network, which communicatively couples the ATM and the wireless device via a server. In some embodiments, the server may be configured to service transactions associated with the ATM. In some examples, the server may be associated with a respective financial institution, in order to process ATM transactions. Typically, such a financial institution may be a credit card company that has issued the transaction card to the user, a financial service entity that provides banking accounts associated with the card to the user, and the like. In this scenario, the communication session between the ATM with the wireless device may serve as an operation locking mechanism such that, as long as the communication session is alive, the ATM is not operable by another user who attempts to transact at the ATM itself. In other words, as long as the ATM starts a communication session with the wireless device, the user of the wireless takes over all the interaction, via the wireless device, at the ATM.

According to various embodiments, once the communication session is established to connect the ATM and the wireless device, portions of the conventional user interface of the ATM cease to function or function with limited capabilities. For instance, input devices such as a touch screen, function keys, and keypad are no longer operative to intake any input thereat. Similarly, output devices such a display, headphone jack, and speaker are also no longer operative to output visual or voice based information that is available during conventional ATM transaction sessions in which the user interacts with the ATM directly. However, one or more of other input devices of the ATM such as the first and second NFC components, camera, other sensors for biometric features intake, and/or other input devices that may be involved with the ATM accessibility processes herein remain operative, in conjunction with the transaction card, the wireless device, and/or a server configured to service the ATM. Also similarly, one or more of other output devices of the ATM such as a transaction receipt printer, a cash bill dispenser, and a deposit opening remain operative to service the ATM transactions performed by the user at the wireless device.

The ATM accessibility process 300 may include, at 306, a step of instructing the app to provide a first graphical user interface (GUI) to the user, the first GUI comprising one or more graphical user interface (GUI) elements prompting the user to enter account login information associated with the user account.

The ATM accessibility process 300 may include, at 308, a step of authenticating the user for access to the user account at the wireless device based at least on the entered account login information. In various embodiments, the user may be further authenticated for access to the user account at the wireless device via any suitable techniques. For non-limiting examples, the user may be further authenticated for access to the user account based on his or her biometric information, which may be collected at the ATM, the transaction card, and/or the wireless device. Such biometric information including one or more of: a facial feature of the user, a voice feature of the user, and/or a fingerprint feature of the user.

The ATM accessibility process 300 may include, at 310, a step of commencing, in response to successful authentication of the user, an ATM transaction session for the user by instructing the app to provide a second GUI to the user at the wireless device. According to various embodiments, the second GUI may comprise one or more GUI elements operable by the user to perform one or more ATM transactions with the user account at the wireless device. Further, various embodiments herein may be configured such that the first GUI and/or the second GUI may be configured to enable user interactions with the ATM via one or more of: a visual mode, an audible mode, a Morse code mode, and a tactile based mode. For example, the first GUI and/or the second GUI may be configured to provide audible transaction prompts to the user at a headphone communicatively connected to the wireless device; and receive inputs entered at the wireless device by the user in Morse code and/or a touch based input technique.

In some embodiments, the one or more elements of the second GUI may be customized based on user preferences regarding ATM transactions. For instance, the second GUI may be customized to initially display those ATM access menu items selectively configured, for example, via the ATM application. This way, the user is saved from navigating a general menu of the ATM in order to perform transactions. In other words, the user may use the ATM application to specify/modify his or her preferred ATM transactions (e.g., quick cash withdrawal of a personalized amount, transfers between accounts, deposits into accounts).

According to some embodiments, the communication session between the ATM and the wireless device may conclude upon the user operates the one or more second GUI elements at the wireless device to send a conclusion request to the ATM. Here, for example, the user may operate a "log out" button of the second GUI, tap in Morse code elements corresponding to a "log out" signal at the second GUI, touch a "log out" braille icon at the second GUI, or speak a command "log out" at the second GUI.

In other embodiments, the communication session between the ATM and the wireless device may automatically conclude upon detecting that the wireless device of the user is no longer present in proximity to the ATM. For example, using the above-described proximity detection techniques, the ATM may be configured to detect the wireless device moving out its vicinity by one or more of: detecting a geo-location associated with the wireless device indicating that the wireless device is no longer in proximity to the ATM; and/or detecting a loss of wireless signals transmitted from the wireless device indicating that the wireless device is no longer in proximity to the ATM. In some implementations, such loss of wireless signals may comprise a loss of NFC signals such as a Bluetooth signals indicating that paired devices are no longer in communication range with each other.

According to some embodiments, methods herein may also comprise, instructing, in response to the ATM app being activated by the user on the wireless device, the ATM app to notify the user of a location of the ATM based on geo-location information of the wireless device and/or Bluetooth discovery result by the wireless device. Here, for example, when the user actives the ATM app at the wireless device, it is determined that the user is actively searching for an ATM nearly to perform transactions upon. In some embodiments, methods herein may also comprise transmitting one or more of location information, navigation instructions, and/or map application data, to the ATM app and/or the wireless device of the user.

Further, it is noted that the disclosed systems, platforms, methods, and computer-readable media comprise multi-modal ATM accessibility mechanisms that may include and/or involve a software application configured to perform various automated, mobile device functionality set forth herein. Unlike conventional software and solutions, various embodiments disclosed herein may utilize an improved ATM with multimodal accessibility that may, via the use of detecting a presence of a wireless device of a user in proximity, and establishing a secure communication session between the ATM and the wireless device, be configured to provide improved accessibility to the ATM at the wireless device of the user. In these and other ways, implementations involving the software empowered with the exemplary disclosed wireless device based ATM accessibility mechanisms represent an improvement over any conventional ATM accessing techniques known.

Aspects of the disclosed multimodal ATM accessibility mechanisms also yield more efficient and otherwise improved utilization of both processing and communication resources, such as via detecting a presence of a wireless device of a user in proximity, establishing a secure communication session between the ATM and the wireless device upon the detected presence, authenticating the user for access to an account, and commencing an ATM transaction session to allow the user to perform ATM transactions at the wireless device via expanded modalities. Moreover, various exemplary embodiments enabled by the disclosed ATM accessing mechanisms may allow for improved responsiveness, efficiency, accuracy, security, and expanded modality enabled by various features of wireless devices of the user, in providing ATM services, and reducing likelihood that owners of mobile devices executing such software are exposed to inability to interact with the ATM or fraud, thereby reducing or eliminating the need for unnecessary processing caused by inoperability and/or fraudulent transactions otherwise avoided by the present detection mechanisms.

Figure 4:
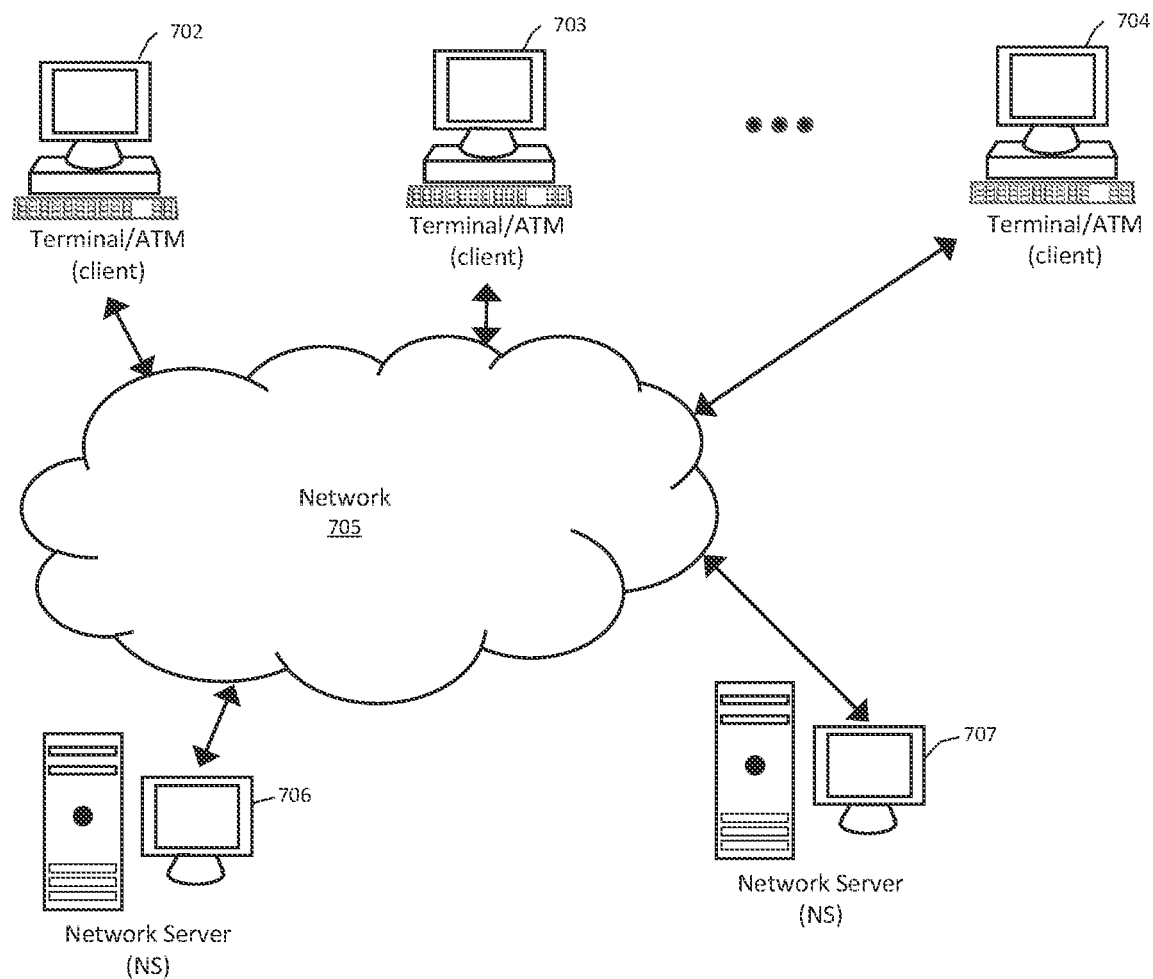
FIG. 4 is a block diagram depicting an exemplary computer-based system and/or platform, in accordance with certain embodiments of the present disclosure.

FIG. 4 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 4, members 702-704 (e.g., POS devices or clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mas s storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 4, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
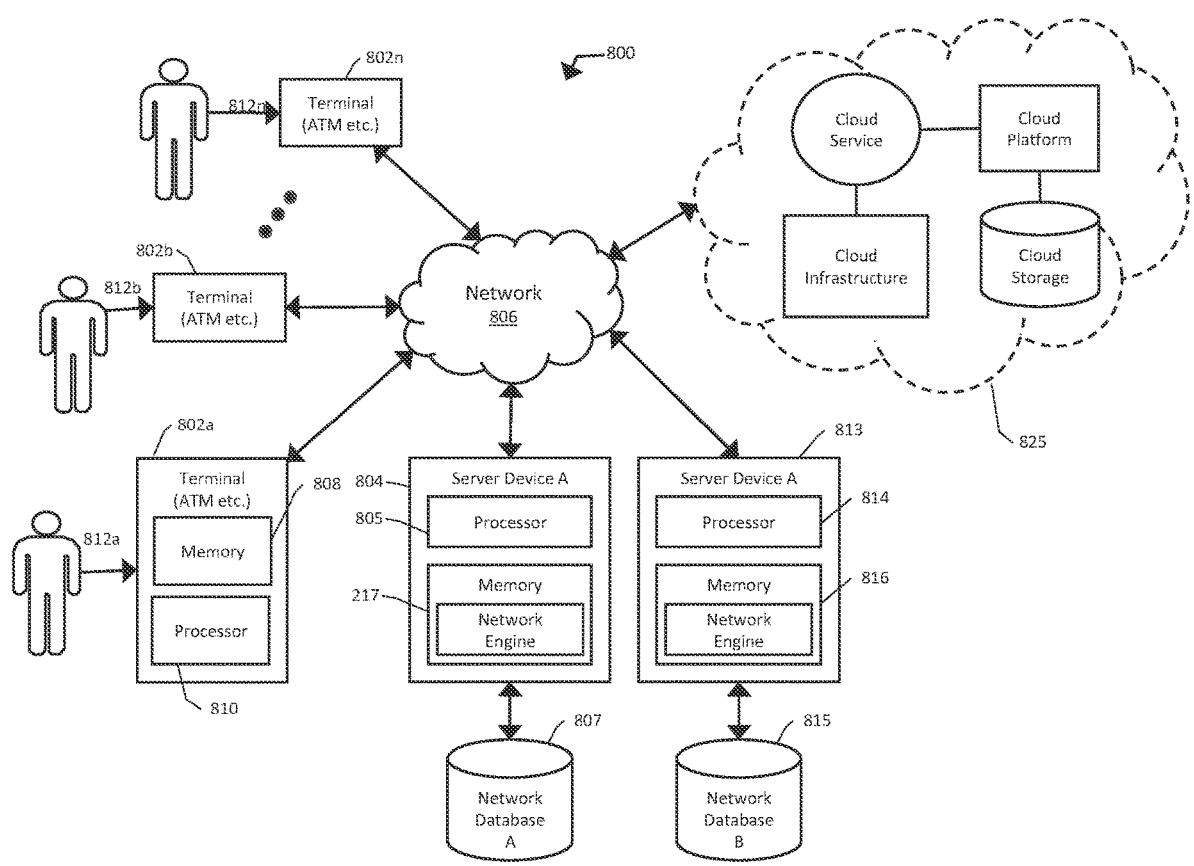
FIG. 5 is a block diagram depicting another exemplary computer-based system and/or platform, in accordance with certain embodiments of the present disclosure.

FIG. 5 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., POS devices) 802a, 802b through 802n shown each at least includes a computer-readable medium, such as a random-access memory (RAM) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806. As shown in FIG. 5, exemplary server devices 804 and 813 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable data organization that may result in one or more applicable data structures that may include fields, records, files, and/or objects. In some embodiments, the exemplary DBMS-managed database may be specifically programmed to include metadata about the data that is stored.

Figure 6:
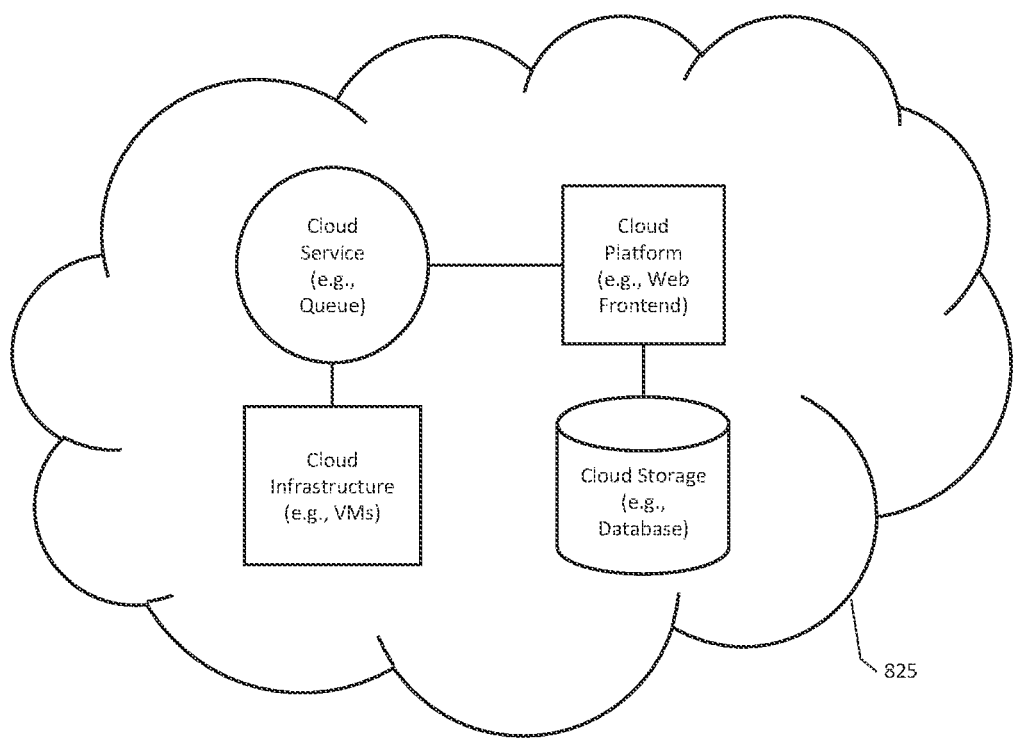
FIGS. 6 and 7 are diagrams illustrating two exemplary implementations of cloud computing architecture/aspects with respect to which the disclosed technology may be specifically configured to operate, in accordance with certain embodiments of the present disclosure.
Figure 7:
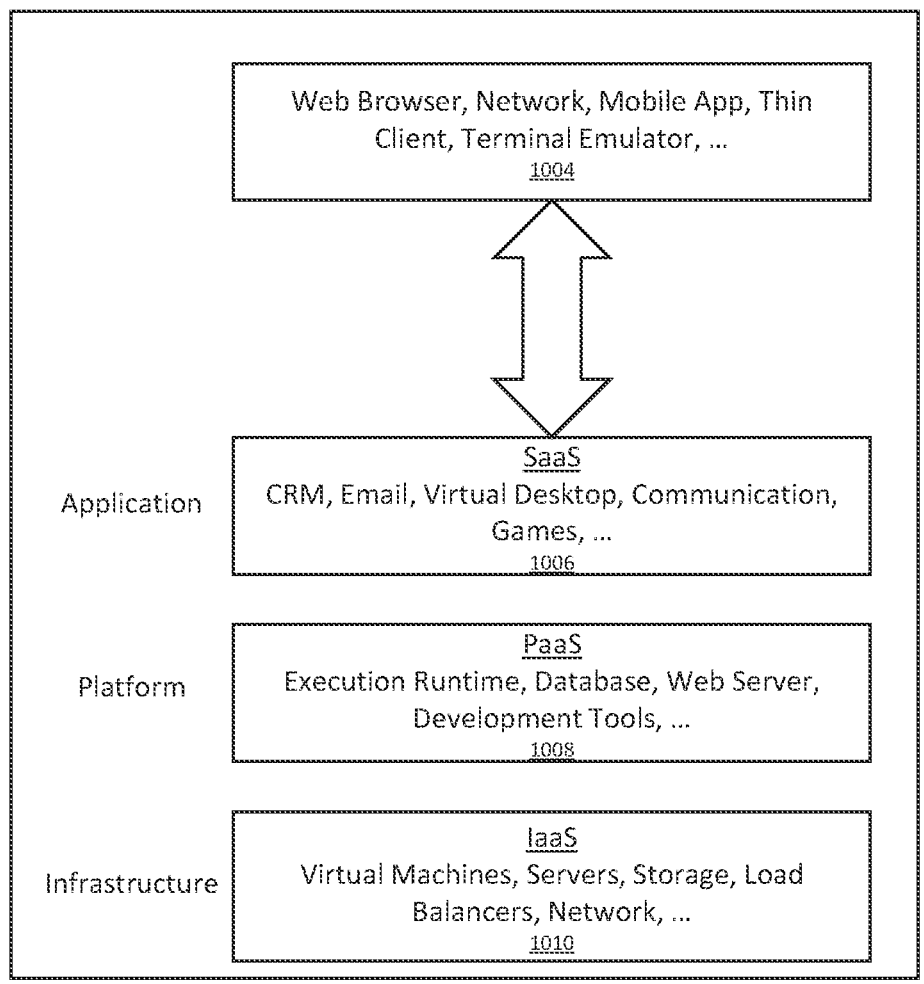

As also shown in FIGS. 6 and 7, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 7, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 6 and 7 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve various embodiments detailed herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.). Computer-related systems, computer systems, and systems, as used herein, include any combination of hardware and software.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 6-7) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various interactions with an ATM, for example, without limitation, as part of MFA authentication process and/or session interaction, one or more of the following applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
  detecting, by an ATM, a presence of a wireless device of a user in proximity to the ATM, the wireless device configured with an app having instructions executable in connection with authenticating the user to gain access to a user account of the user via the ATM;
  establishing, by the ATM and in response to the detection of the presence of the wireless device in proximity to the ATM, a communication session between the ATM and the wireless device based on a session key, the session key being received by the wireless device from a transaction card of the user and communicated by the wireless device to the ATM;
  instructing, by the ATM, the app to provide a first graphical user interface (GUI) to the user, the first GUI comprising one or more graphical user interface (GUI) elements prompting the user to enter account login information associated with the user account;
authenticating, by the ATM, the user for access to the user account at the wireless device based at least on the entered account login information; and
commencing, by the ATM and in response to successful authentication of the user, an ATM transaction session for the user by instructing the app to provide a second GUI to the user at the wireless device, the second GUI comprising one or more GUI elements operable by the user to perform one or more ATM transactions with the user account at the wireless device,
wherein the first GUI and the second GUI are configured to enable user interactions with the ATM via one or more of: a visual mode, an audible mode, a Morse code mode, and a tactile based mode.

Clause 2. The method of clause 1 or of any clause herein, wherein operations corresponding to the user interactions with the app at the wireless device are communicated to the ATM over the communication session between the wireless device and the ATM.

Clause 3. The method of clause 1 or of any clause herein, wherein operations corresponding to the user interactions with the app at the wireless device are communicated to the ATM over a network, the network communicatively coupling the ATM and the wireless device via a server, the server configured to service transactions associated with the ATM.

Clause 4. The method of clause 1 or of any clause herein, wherein the session key is generated based on a first interaction between the transaction card and the ATM.

Clause 5. The method of clause 1 or of any clause herein, wherein the session key is shared with the wireless device via a second interaction between the transaction card and the wireless device.

Clause 6. The method of clause 5 or of any clause herein, wherein the transaction card comprises an RFID chip.

Clause 7. The method of clause 1 or of any clause herein, wherein the detection of the presence of the user in proximity to the ATM comprises one or more of:
displaying first scannable information on a display screen of the ATM and receiving an indication that the first scannable information is scanned by the wireless device;
scanning, by a camera of the ATM, second scannable information displayed at the wireless device;
detecting a geo-location associated with the wireless device indicating that the wireless device is in proximity to the ATM; and
detecting a wireless signal transmitted from the wireless device indicating that the wireless device is in proximity to the ATM.

Clause 8. The method of clause 1 or of any clause herein, wherein the authenticating the user for access to the user account at the wireless device further comprises:
authenticating the user based on biometric information of the user, the biometric information including one or more of: a facial feature of the user, a voice feature of the user, and a fingerprint feature of the user.

Clause 9. The method of clause 1 or of any clause herein, wherein the one or more GUI elements of the second GUI comprise ATM access menu customized for the wireless device when paired with the ATM Clause 10. The method of clause 1 or of any clause herein, wherein the first GUI and the second GUI are configured to provide audible transaction prompts to the user at a headphone communicatively connected to the wireless device; and receive inputs entered at the wireless device by the user in Morse code and/or a touch based input technique.

Clause 11. An ATM comprising:
one or more processors; and
a memory in communication with the one or more processors and storing instructions that, when executed by the one or more processors, cause the ATM to:
detect a presence of a wireless device of a user in proximity to the ATM, the wireless device configured with an app having instructions executable in connection with authenticating the user to gain access to a user account of the user via the ATM;
establish, in response to the detection of the presence of the wireless device in proximity to the ATM, a communication session between the ATM and the wireless device based on a session key, the session key being received by the wireless device from a transaction card of the user and communicated by the wireless device to the ATM;
instruct the app to provide a first graphical user interface (GUI) to the user, the first GUI comprising one or more graphical user interface (GUI) elements prompting the user to enter account login information associated with the user account;
authenticate the user for access to the user account at the wireless device based at least on the entered account login information; and
commence, in response to successful authentication of the user, an ATM transaction session for the user by instructing the app to provide a second GUI to the user at the wireless device, the second GUI comprising one or more GUI elements operable by the user to perform one or more ATM transactions with the user account at the wireless device,
wherein the first GUI and the second GUI are configured to enable user interactions with the ATM via one or more of: a visual mode, an audible mode, a Morse code mode, and a tactile based mode.

Clause 12. The ATM of clause 11 or of any clause herein, wherein operations corresponding to the user interactions with the app at the wireless device are communicated to the ATM over the communication session between the wireless device and the ATM.

Clause 13. The ATM of clause 11 or of any clause herein, wherein operations corresponding to the user interactions with the app at the wireless device are communicated to the ATM over a network, the network communicatively coupling the ATM and the wireless device via a server, the server configured to service transactions associated with the ATM.

Clause 14. The ATM of clause 11 or of any clause herein, wherein the session key is generated based on a first interaction between the transaction card and the ATM.

Clause 15. The ATM of clause 11 or of any clause herein, wherein the session key is shared with the wireless device via a second interaction between the transaction card and the wireless device.

Clause 16. The ATM of clause 5 or of any clause herein, wherein the transaction card comprises an RFID chip.

Clause 17. The ATM of clause 11 or of any clause herein, wherein to detect the presence of the user in proximity to the ATM comprises one or more of:

display first scannable information on a display screen of the ATM and receiving an indication that the first scannable information is scanned by the wireless device;
scan, by a camera of the ATM, second scannable information displayed at the wireless device;
detect a geo-location associated with the wireless device indicating that the wireless device is in proximity to the ATM; and
detect a wireless signal transmitted from the wireless device indicating that the wireless device is in proximity to the ATM.

Clause 18. The ATM of clause 11 or of any clause herein, wherein to authenticate the user for access to the user account at the wireless device further comprises:
authenticate the user based on biometric information of the user, the biometric information including one or more of: a facial feature of the user, a voice feature of the user, and a fingerprint feature of the user.

Clause 19. The ATM of clause 11 or of any clause herein, wherein the one or more GUI elements of the second GUI comprise ATM access menu customized for the wireless device when paired with the ATM.

Clause 20. The ATM of clause 11 or of any clause herein, wherein the first GUI and the second GUI are configured to provide audible transaction prompts to the user at a headphone communicatively connected to the wireless device; and receive inputs entered at the wireless device by the user in Morse code and/or a touch based input technique.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
detecting, by a processor of an automated teller machine (ATM) comprising a wireless transceiver, a presence of a wireless device of a user in proximity to the ATM based on at least one communication by the wireless device;
receiving, by the processor via the wireless transceiver from a transaction card, a seed number associated with the user;
generating, by the processor, a first session key based at least in part on the seed number;
receiving, by the processor via the wireless transceiver, a second session key from the wireless device, wherein the second session key is produced by the wireless device based at least in part on the seed number, wherein the wireless device is configured to obtain the seed number from the transaction card;
determining, by the processor, a match between the first session key and the second session key;
authenticating, by the processor, the wireless device based on the match between the first session key and the second session key;
establishing, by the processor based on authenticating the wireless device and the presence of the wireless device in proximity to the ATM, a secure communication session between the wireless transceiver of the ATM and the wireless device to enable the wireless device to gain access to a user account of the user; and
wherein the wireless device is capable, via the secure communication session, to transmit at least one signal to the ATM to control the ATM to operate, in response to at least one ATM device command from the wireless device, at least one of:
a transaction receipt printer to print at least one transaction receipt associated with at least one transaction performed via the secure communication session,
a cash bill dispenser to dispense cash based at least in part on the at least one transaction performed via the secure communication, or
a deposit opening to accept cash associated with the at least one transaction performed via the secure communication session.

2. The method of claim 1, wherein operations corresponding to user interactions with the wireless device are communicated to the ATM over the secure communication session between the wireless device and the ATM.

3. The method of claim 1, wherein operations corresponding to user interactions with the wireless device are communicated to the ATM over a network, the network communicatively coupling the ATM and the wireless device via a server, the server configured to service transactions associated with the ATM.

4. The method of claim 1, wherein the first session key is generated based on a first interaction between the transaction card and the ATM.

5. The method of claim 1, wherein the first session key is shared with the wireless device via a second interaction between the transaction card and the wireless device.

6. The method of claim 5, wherein the transaction card comprises an radio frequency identification (RFID) chip.

7. The method of claim 1, wherein the detection of the presence of the user in proximity to the ATM comprises one or more of:
displaying first scannable information on a display screen of the ATM and receiving an indication that the first scannable information is scanned by the wireless device;
scanning, by a camera of the ATM, second scannable information displayed at the wireless device;
detecting a geo-location associated with the wireless device indicating that the wireless device is in proximity to the ATM; and
detecting a wireless signal transmitted from the wireless device indicating that the wireless device is in proximity to the ATM.

8. The method of claim 1, wherein the authenticating the user for access to the user account at the wireless device further comprises:
authenticating the user based on biometric information of the user, the biometric information including one or more of: a facial feature of the user, a voice feature of the user, and a fingerprint feature of the user.

9. The method of claim 1, further comprising instructing, by the processor, the wireless device to present one or more GUI elements of a GUI, wherein the GUI comprises an ATM access menu customized for the wireless device when paired with the ATM.

10. The method of claim 1, further comprising:
instructing, by the processor, the wireless device to present one or more GUI elements of a GUI, wherein the GUI is configured to provide audible transaction prompts to the user at a headphone communicatively connected to the wireless device; and receive inputs entered at the wireless device by the user in Morse code and/or a touch based input technique.

11. A system comprising:

one or more processors; and a memory in communication with the one or more processors and storing instructions that, when executed by the one or more processors, cause the one or more processors to:

detecting, by a processor of an automated teller machine (ATM) comprising a wireless transceiver, a presence of a wireless device of a user in proximity to the ATM based on at least one communication by the wireless device;

receiving, by the processor via the wireless transceiver from a transaction card, a seed number associated with the user;

generating, by the processor, a first session key based at least in part on the seed number;

receiving, by the processor via the wireless transceiver, a second session key from the wireless device, wherein the second session key is produced by the wireless device based at least in part on the seed number, wherein the wireless device is configured to obtain the seed number from the transaction card;

determining, by the processor, a match between the first session key and the second session key;

authenticating, by the processor, the wireless device based on the match between the first session key and the second session key;

establishing, by the processor based on authenticating the wireless device and the presence of the wireless device in proximity to the ATM, a secure communication session between the wireless transceiver of the ATM and the wireless device to enable the wireless device to gain access to a user account of the user; and wherein the wireless device is capable, via the secure communication session, to transmit at least one signal to the ATM to control the ATM to operate, in response to at least one ATM device command from the wireless device, at least one of:

a transaction receipt printer to print at least one transaction receipt associated with at least one transaction performed via the secure communication session, a cash bill dispenser to dispense cash based at least in part on the at least one transaction performed via the secure communication, or a deposit opening to accept cash associated with the at least one transaction performed via the secure communication session.

12. The system of claim 11, wherein operations corresponding to user interactions with the wireless device are communicated to the ATM over the secure communication session between the wireless device and the ATM.

13. The system of claim 11, wherein operations corresponding to user interactions with the wireless device are communicated to the ATM over a network, the network communicatively coupling the ATM and the wireless device via a server, the server configured to service transactions associated with the ATM.

14. The system of claim 11, wherein the first session key is generated based on a first interaction between the transaction card and the ATM.

15. The system of claim 11, wherein the first session key is shared with the wireless device via a second interaction between the transaction card and the wireless device.

16. The system of claim 15, wherein the transaction card comprises an radio frequency identification (RFID) chip.

17. The system of claim 11, wherein the detection of the presence of the user in proximity to the ATM comprises one or more of:

displaying first scannable information on a display screen of the ATM and receiving an indication that the first scannable information is scanned by the wireless device;

scanning, by a camera of the ATM, second scannable information displayed at the wireless device;

detecting a geo-location associated with the wireless device indicating that the wireless device is in proximity to the ATM; and detecting a wireless signal transmitted from the wireless device indicating that the wireless device is in proximity to the ATM.

18. The system of claim 11, wherein the authenticating the user for access to the user account at the wireless device further comprises:

authenticating the user based on biometric information of the user, the biometric information including one or more of: a facial feature of the user, a voice feature of the user, and a fingerprint feature of the user.

19. The system of claim 11, wherein the instructions, when executed by the one or more processors, further cause the one or more processors to instruct the wireless device to present one or more GUI elements of a GUI, wherein the GUI comprises an ATM access menu customized for the wireless device when paired with the ATM.

20. The system of claim 11, wherein the instructions, when executed by the one or more processors, further cause the one or more processors to:

instruct the wireless device to present one or more GUI elements of a GUI, wherein the GUI is configured to provide audible transaction prompts to the user at a headphone communicatively connected to the wireless device; and receive inputs entered at the wireless device by the user in Morse code and/or a touch based input technique.

* * * * *